United States Patent
Bernett et al.

(10) Patent No.: US 6,608,732 B2
(45) Date of Patent: Aug. 19, 2003

(54) DAMPER FOR DISC DRIVE VOICE COIL MOTOR

(75) Inventors: Frank William Bernett, Longmont, CO (US); Loutfi E. Charara, Thornton, CO (US); Gary Frank Kelsic, Longmont, CO (US); David Ray Lapp, Boulder, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 176 days.

(21) Appl. No.: 09/896,611

(22) Filed: Jun. 29, 2001

(65) Prior Publication Data

US 2002/0047339 A1 Apr. 25, 2002

Related U.S. Application Data

(60) Provisional application No. 60/220,719, filed on Jul. 26, 2000.

(51) Int. Cl.[7] .............................................. G11B 33/14
(52) U.S. Cl. .................... 360/97.02; 360/269.7
(58) Field of Search ...................... 360/97.01–97.03, 360/264.3–266.1

(56) References Cited

U.S. PATENT DOCUMENTS

| | | | | |
|---|---|---|---|---|
| 4,553,183 A | * | 11/1985 | Brown | 360/97.02 |
| 5,214,549 A | | 5/1993 | Baker et al. | 360/97.02 |
| 5,260,618 A | | 11/1993 | Dunfield et al. | 310/154 |
| 5,483,398 A | | 1/1996 | Boutaghou | 360/97.02 |
| 5,587,855 A | | 12/1996 | Kim | 360/97.02 |
| 5,666,239 A | | 9/1997 | Pottebaum | 360/97.03 |
| 5,757,580 A | | 5/1998 | Andress et al. | 360/97.02 |
| 5,761,184 A | | 6/1998 | Dauber et al. | 369/247 |
| 5,781,373 A | | 7/1998 | Larson et al. | 360/97.02 |
| 5,982,580 A | | 11/1999 | Woldemar et al. | 360/97.02 |
| 5,999,374 A | | 12/1999 | Kim | 360/106 |

* cited by examiner

Primary Examiner—A. J. Heinz
(74) Attorney, Agent, or Firm—Merchant & Gould P.C.

(57) ABSTRACT

A disc drive device includes a base plate having an upper surface, a voice coil motor operably attached to the upper surface of the base plate, and a damper pad positioned on the upper surface of the base plate between the base plate and the voice coil motor such that vibrations occurring in the base plate and/or the voice coil motor are effectively damped. In this manner, vibrationally induced noise in a disc drive servo system and vibrationally induced acoustical emissions from the disc drive device are reduced.

21 Claims, 4 Drawing Sheets

DAMPER FOR DISC DRIVE VOICE COIL MOTOR

RELATED APPLICATIONS

This application claims priority of U.S. provisional application Serial No. 60/220,719, filed Jul. 26, 2000.

FIELD OF THE INVENTION

The invention is generally directed to the field of disc drives and more particularly to controlling acoustic noise emissions emanating from a disc drive voice coil motor assembly.

BACKGROUND OF THE INVENTION

Modern hard disc drives comprise one or more rigid discs that are coated with a magnetizable medium and mounted on the hub of a spindle motor for rotation at a constant high speed. Information is stored on the discs in a plurality of concentric circular tracks. Data is written to, and read from, the tracks via transducers ("heads") mounted to a radial actuator, which positions the heads relative to the discs.

Typically, such radial actuators employ a voice coil motor (VCM) to position the heads with respect to the disc surfaces. The heads are mounted via flexures at the ends of a plurality of arms which project radially outward from a substantially cylindrical actuator body. The actuator body pivots about a shaft mounted to the disc drive housing at a position closely adjacent the outer extreme of the discs. The pivot shaft is parallel with the axis of rotation of the spindle motor and the discs, so that the heads move in a plane parallel with the surfaces of the discs.

Normally, the VCM includes a coil mounted on the side of the actuator body opposite the head arms between an array of permanent magnets which are held above and/or below the coil on upper and/or lower magnet plates, respectively. When controlled current is passed through the coil, a magnetic field is generated. The generated electromagnetic field interacts with the magnetic field of the permanent magnets thus causing the coil to move relative to the magnets in accordance with the well-known Lorentz relationship. As the coil moves, the actuator body pivots about the pivot shaft and the heads are moved across the disc surfaces.

Typically, the heads are supported on the actuator arms in a position over the discs by actuator slider assemblies which include air-bearing surfaces designed to interact with a thin layer of moving air generated by the rotation of the discs, so that the heads may "fly" over the disc surfaces. Generally, the heads write data to a selected data track on the disc surface by selectively magnetizing portions of the data track through the application of a time-varying write current to the head. In order to subsequently read back the data stored on the data track, the head detects flux transitions in the magnetic fields of the data track and converts these flux transitions to a signal which is decoded by read channel circuitry of the disc drive.

A closed-loop servo system is used to control the position of the heads with respect to the disc surfaces. More particularly, during a track following mode in which a head is caused to follow a selected data track, servo information is read which provides a position error signal indicative of the position of the head relative to a center line of the track. The position error signal is used, when necessary, to generate a correction signal that in turn is provided to a power amplifier. The power amplifier then passes current through the actuator coil to adjust the position of the head relative to the track.

During a seek operation, the servo system receives the address of the destination track and generates control signals that cause the heads to initially accelerate and then subsequently decelerate as the head nears the destination track. At some point towards the end of the deceleration of the head, the servo system will transition to a settle mode during which the head is settled onto the destination track and, thereafter, the servo system causes the head to follow the destination track in a track following mode.

Generally, the objective of a typical seek operation has been to move the head from the initial track to the destination track in a minimum amount of time (access time). However, one drawback associated with rapidly moving heads to the destination track is the occurrence of mechanical vibrations excited in the upper and/or lower magnet plates during the seek operation. These vibrations may induce noise into the servo control loop of the disc drive, thus making accurate track following difficult. As will be understood, the negative affects of vibrationally induced noise in the servo system are compounded as the track density or tracks per inch (TPI) of the disc drive is increased. The general trend in the disc drive industry is to produce disc drives having ever increasing TPI. As such, it is imperative that new methods and techniques are developed to address vibrationally induced servo system noise. Additionally, these vibrations can generate excessive acoustic noise emissions from the disc drive.

Along with the general trend in the industry to provide disc drives having greater TPI, there is also a trend to reduce the level of acoustic emissions generated by disc drives. A primary source of acoustical emissions from a disc drive is the amplification of the aforementioned vibrations of the magnet plates by the top cover and by the base of the disc drive. These vibrations occurring in the magnetic plates of the voice coil motor may be transmitted to the top cover and/or the disc drive base either as sympathetic vibrations or as direct transmissions. As in any vibrating system, the magnet plates, as well as possibly the top cover and base of the disc drive, are manifested in particular modes of vibration. These modes of vibration occur in such a way that a number of elements of the system vibrate with the same frequency.

One approach to reducing the acoustical emissions from the disc drive has been to slow down the seek operation. A slowed down seek operational setting, called a quite seek, is often provided in disc drives as an optional setting. The alternative operational setting in disc drives having a quite seek setting is an operational setting commonly referred to as the performance seek, where the seek to the track occurs quickly relative to the quite seek. However, while the quite seek reduces the acoustical emissions from the disc drive, it also necessarily reduces disc drive performance. Disc drives including such quite seek operational settings are often employed in areas, such as government and private offices, that are subject to strict environmental noise limitations.

Another approach to reducing the acoustical emissions from the disc drive is to add a damping material between the upper magnetic plate and the top cover of the disc drive. For this approach to be effective, the top cover must be sufficiently rigid to provide deflection of the damping material. However, the stiffness required for this approach to be useful often adds unacceptable weight and manufacturing costs to the disc drive. Additionally, comparative tests indicated that placing the damping material between the upper magnet plate and the top cover is not as effective as other methods, including the methods described with respect to the present invention.

Another approach to reducing the acoustical emissions from the disc drive involves securing the upper magnet plate to the top cover of the disc drive, either directly or with an intermediary damping material positioned between the upper magnetic plate and the top cover of the disc drive. This approach, however, has proven to be ineffective in disc drives employing light weight or relatively thin top covers where the top cover tends to behave like a speaker cone amplifying the vibrations from the coupled upper magnetic plate.

Accordingly there is a need for a disc drive damping system and/or method which effectively reduces VCM vibrations in a disc drive and, thereby, reduces acoustical emissions and vibrationally induced noise in the disc drive's servo system.

SUMMARY OF THE INVENTION

Against this backdrop various embodiments of the present invention has been developed. In general, the various embodiments of the present invention relate to systems and methods of minimizing vibrationally induced noise in a disc drive servo system. Additionally, embodiments of the present invention relate to reducing vibrationally induced acoustical emissions from a disc drive device.

One embodiment of the present invention relates to a disc drive including a base plate having an upper surface, a voice coil motor operably attached to the upper surface of the base plate, and a damper pad positioned on the upper surface of the base plate between the base plate and the voice coil motor for damping vibrations occurring in the base plate and/or the voice coil motor.

Another embodiment relates to a disc drive including a base plate having an upper surface, a voice coil motor operably attached to the upper surface of the base plate, wherein the voice coil motor has a lower magnetic plate that is spaced from the upper surface of the base plate. A damper pad is preferably positioned on the upper surface of the base plate between the base plate and the lower magnetic plate such that vibrations occurring in the base plate and both the lower magnet plate and upper magnet plate are dampened.

Additionally, yet another embodiment relates to a disc drive damping system comprising a disc drive having a base plate and a voice coil motor connected to the base plate and a damping means positioned between the voice coil motor and the base plate for damping vibrations in the disc drive.

These and various other features as well as advantages which characterize the various embodiments of the present invention will be apparent from a reading of the following detailed description, a review of the associated drawings, and the appended claims.

DETAILED DESCRIPTION

In general, the present disclosure describes methods and systems for dampening vibrations in, and acoustical emissions from, a disc drive device. More particularly, the present disclosure describes a system and method for reducing vibrational modes induced in and by a disc drive voice coil motor (VCM).

Figure 1:
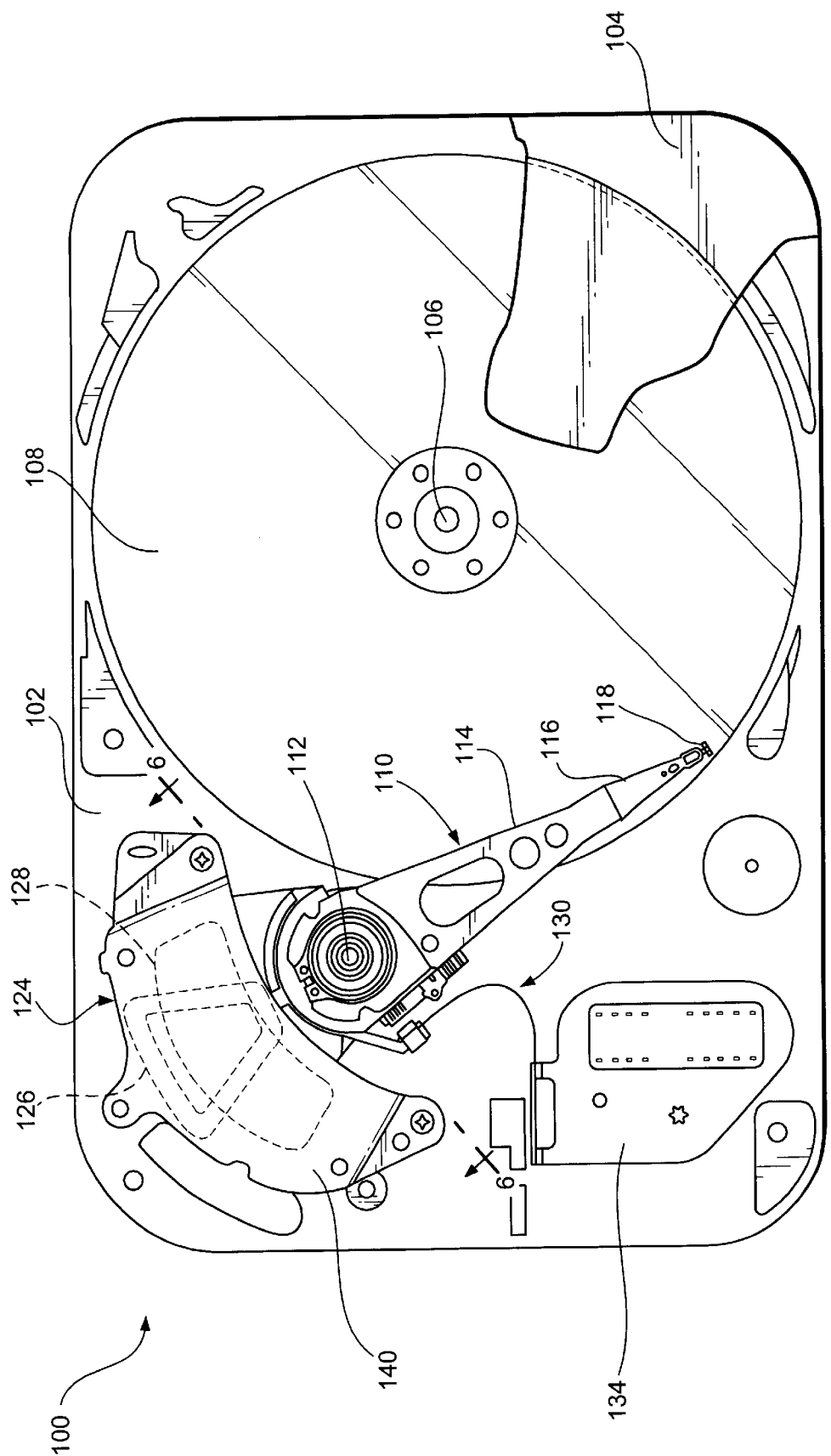
FIG. 1 is a plan view of a disc drive incorporating an embodiment of the present invention showing the primary internal components.

Referring to FIG. 1, a disc drive 100 in which the methods and system of the present invention may be practiced is shown. The disc drive 100 includes a base plate 102 to which various components of the disc drive 100 are mounted. A top cover 104, shown partially cut away, cooperates with the base plate 102 to form an internal, sealed environment for the disc drive in a conventional manner. The components include a spindle motor 106 which rotates one or more discs 108 at a constant high speed. Information is written to, and read from, tracks on the discs 108 through the use of an actuator assembly 110, which rotates during a seek operation about a bearing shaft assembly 112 positioned adjacent the discs 108. The actuator assembly 110 includes a plurality of actuator arms 114 which extend toward and over the discs 108, with one or more flexures 116 extending from each of the actuator arms 114. Mounted at the distal end of each of the flexures 116 is a head 118 which includes an air bearing slider (not shown) that enables the head 118 to fly in close proximity to a corresponding surface of an associated disc 108.

During a seek operation, the track position of the heads 118 is controlled through the use of a voice coil motor (VCM) 124, which typically includes a coil 126 attached to the actuator assembly 110, an upper magnet plate 140, a lower magnet plate 242 (FIG. 2), as well as one or more pairs of permanent magnet pairs 128 which establish a magnetic field in which the coil 126 is immersed. The controlled application of current to the coil 126 causes magnetic interaction between the magnet pair(s) 128 and the coil 126 so that the coil 126 moves in accordance with the well known Lorentz relationship. As the coil 126 moves, the actuator assembly 110 pivots about the bearing shaft assembly 112, and the heads 118 are caused to move across the surfaces of the discs 108.

A flex assembly 130 provides the requisite electrical connection paths for the actuator assembly 110 while allowing pivotal movement of the actuator assembly 110 during operation. The flex assembly typically includes circuitry to which head wires (not shown) are connected. The head wires are routed along the actuator arms 114 and the flexures 116 to the heads 118. The flex assembly circuitry typically controls the write currents applied to the heads 118 during a write operation and amplifies read signals generated by the heads 118 during a read operation. The flex assembly terminates at a flex bracket 134 for communication through the base 102 to a disc drive printed circuit board (not shown) mounted to the bottom side of the disc drive 100.

Figure 2:
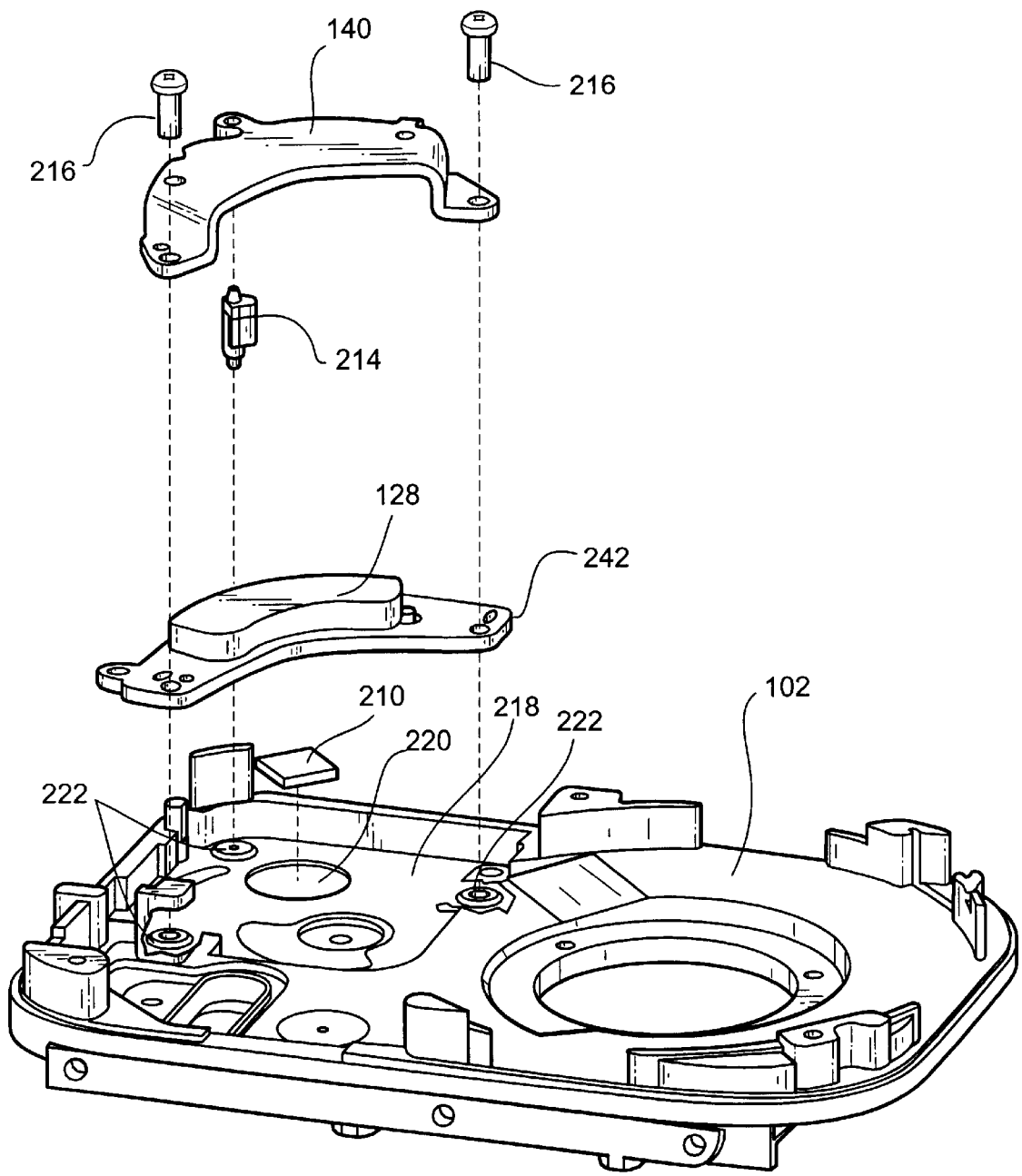
FIG. 2 is an exploded view of the disc drive shown in FIG. 1 showing selected portions of disc drive shown in FIG. 1.

FIG. 2 illustrates an exploded view of the disc drive 100, in accordance with an aspect of the present invention, showing only selected components including the base plate 102, the lower magnetic plate 242, the upper magnetic plate 140, a damper pad 210, the permanent magnet pair 128, a spacer 214, and a number of screws 216 that hold the upper magnet plate to the lower magnet plate and the VCM 124 to the base plate 102. As shown in FIG. 2, the base plate 102 includes a damper pad pocket 220 into which, as described in greater detail below, the damper pad 210 is inserted and held. As also shown in FIG. 2, a number of bosses 222 located on, or integral with, the base plate 102, extend above an upper surface 218 of the base plate 102 and act as spacers, such that when the lower magnet plate 242 is attached to the base plate 102, the lower magnet plate is held a distance above the upper surface 218 of the base plate 102.

Figure 3:
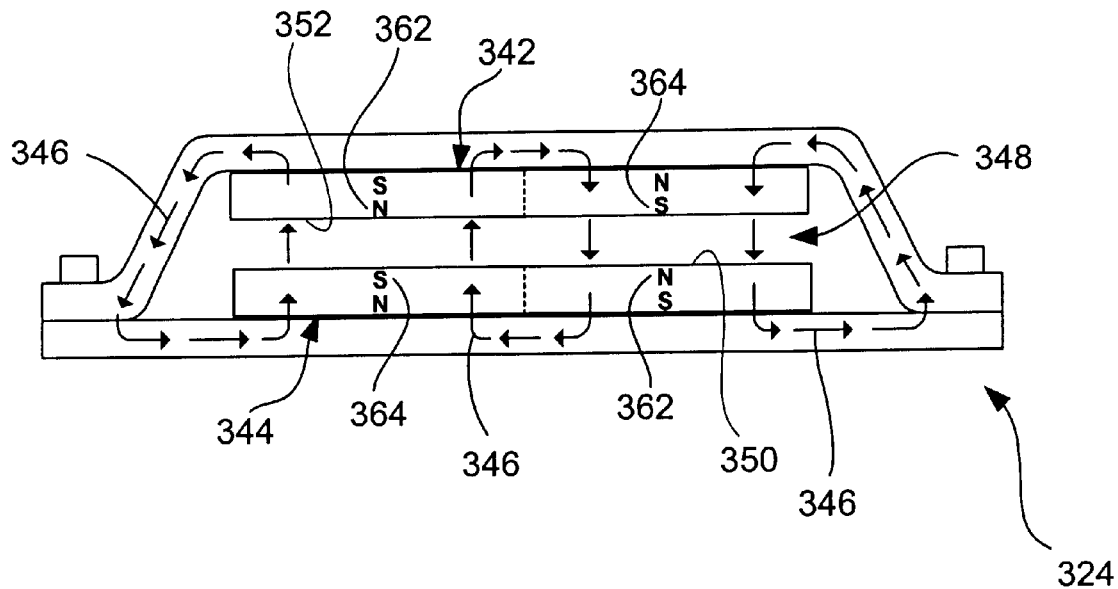
FIG. 3 is a cross-sectional view of a disc drive voice coil motor incorporating opposing permanent magnet pairs.

As described previously, one of the primary sources of servo system noise and acoustical emissions from a disc drive is the vibration of the magnet plates of the VCM 124. As has been discovered by the inventors of the present invention, these vibrations tend to be greater or more pronounced in magnitude in disc drives employing a single magnet pair. One of the causes of the increased vibrations in disc drives employing a single magnet pair is thought to be related to the manner in which the magnetic flux generated by the magnet pair 128 is conducted in the VCM 124. As shown in FIG. 3, in a typical voice coil motor 324 employing two parallel magnet pairs 342 and 344, the lines of magnetic flux 346 generated by the magnet pairs 342 and 344 tend to cross an air gap 348 located between an upper surface 350 of the lower magnet pair 342 and a lower surface 352 of the upper magnet pair 344 in a generally orthogonal direction to surfaces 350 and 352 of the magnet pairs. The orthogonal orientation of the flux lines 346 relative to the surfaces 350 and 352 of the magnet pairs 342 and 344 is thought to be due to a "steering" effect the oppositely facing north 362 and south 364 facing magnetic poles of the magnet pairs 342 and 344 have on the magnetic flux 346. That is, the oppositely facing north 362 and south 364 facing magnetic poles of the magnet pairs 342 and 344 tend to guide the lines of magnetic flux 346 across the air gap 348 located between the magnet pairs 342 and 344 in a generally orthogonal direction to the surfaces 350 and 352 of the magnet pairs.

Figure 4:
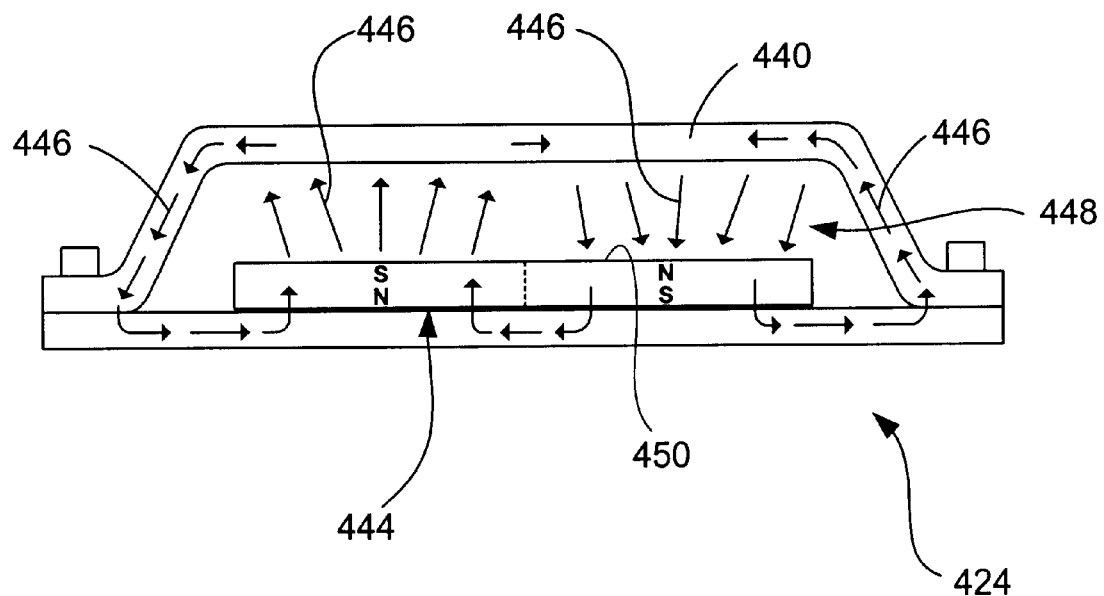
FIG. 4 is a cross-sectional view of a disc drive voice coil motor incorporating a single permanent magnet pair.

In contrast, as shown in FIG. 4, it has been observed that without the guiding influence of the oppositely facing south and north magnetic poles, lines of magnetic flux 446 generated in a VCM 424 having a single magnet pair 444 tend to "fringe" as they cross the air gap 448 between the magnet pair 444 and the upper plate 440. That is, the lines of magnetic flux 446 generated in the VCM 424 employing a single magnet pair 444 do not typically remain orthogonal to the upper surface 450 of the magnet pair 444. It is believed that these non-orthogonal flux lines tend to create out of plane forcing functions in the VCM 424, which in turn increases or exacerbates vibrations in a disc drive.

In addition to the vibrations caused by non-orthogonal flux lines described above, vibrations in the disc drive 100 may also be the result of the rapid movement of the coil 126, and the associated rapid movement of the actuator assembly 110, when the disc drive is in a track seeking mode. As with the vibrations caused by the non-orthogonal flux lines, the vibrations in the disc drive caused by rapid coil movement generate specific modes of vibration within the VCM 124. The modes of vibration caused by the coil movement and the modes of vibration caused by the non-orthogonal flux lines typically combine to form complex modes of vibration in the VCM 124, in the disc drive base 102, and in the top cover 104.

As described above, it has been typical in the disc drive industry to attempt to dampen the noise emitted by a disc drive by placing a dampening material between the upper plate and top cover of a disc drive. As also mentioned above, this manner or arrangement of acoustical damping has not always proven successful. Furthermore, acoustical tests have shown that placing a damping material between an upper plate and a top cover of a disc drive is particularly ineffective in disc drives employing a single magnet pair.

Figure 5:
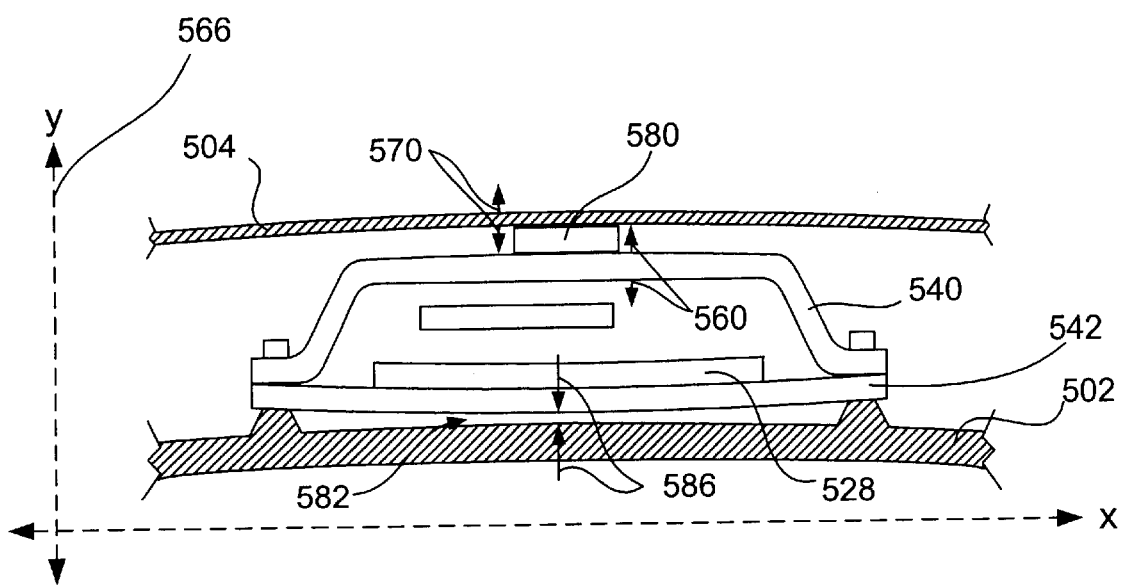
FIG. 5 is a cross-sectional view of a disc drive device having a voice coil motor and a damping pad positioned between voice coil motor and a top cover of the disc drive.

As has been discovered by the inventors of the present invention, the ineffectiveness of placing a damper between a top cover and an upper magnet plate of a disc drive having a single magnet pair is due in large part to the movement of the top cover and the upper magnet plate relative to one another. For example, as shown in FIG. 5, it has been discovered that the vibrational modes of a top cover 504 and upper magnet plate 540 in a disc drive having a single magnet pair 528 are often coincident with one another. That is, the top cover 504 and the upper magnet plate 540 will often be moving in a generally parallel, spaced relation to one another with respect to a y-axis 566, as indicated by arrows 560 and 570 in FIG. 5, during operation of the disc drive. As such, when a damping material 580 is placed between the top cover 504 and the upper magnet plate 540, little or no compression of the damping material 580 is achieved, and thus, little or no vibrational energy is dissipated in the damping material 580.

In contrast, as also shown in FIG. 5, it has been found that the vibrational modes of a lower magnet plate 542 will often move out of phase with the vibrational modes of the base plate 502. Thus, as shown in FIG. 5, the movement of the lower magnet plate 542 relative to the base plate 502 will often result in a lessening of the space 582, or a pinching motion, between the lower magnet plate 542 and the base plate 502, as indicated by arrows 586.

In order to achieve the greatest effectiveness, damping material is ideally placed in a location where it can dampen or absorb the most energy or dampen the greatest number of vibrational modes in a given device. In this respect, damping material will, therefore, be most effective when placed in a location where the damping material will absorb the maximum amount of energy from the movement of the various elements of the device. Surprisingly, and in light of the above discussion, it has been discovered by the inventors of the present invention, that the optimal placement of damping material on or near the VCM 124 of a disc drive, particularly those disc drives employing single magnet pairs, such as disc drive 100, is not between the upper magnet plate 140 and the top cover 102 of a disc drive 100, but rather between the base 102 and the lower magnet plate 242.

Figure 6:
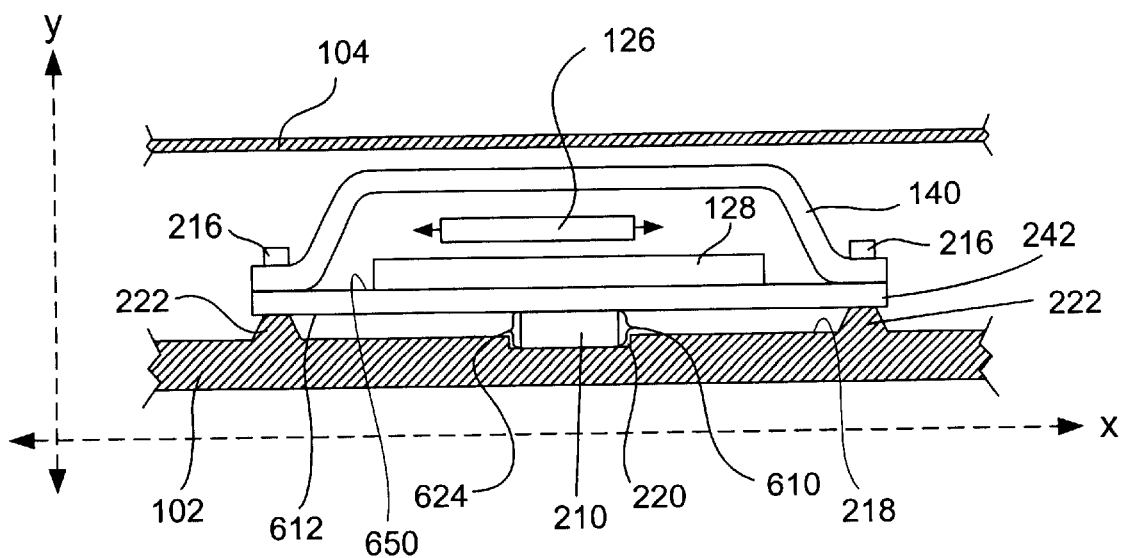
FIG. 6 is a cross-sectional view of the disc drive of FIG. 2, taken in the plane of line 6—6.

As such, one embodiment of the present invention involves placing a damper pad 210 between the lower magnet plate 242 and the base plate 102 of the disc drive 100, as shown in FIGS. 2 and 6. Placed in this manner, the damper pad 210 is "pinched" between the lower magnet plate 242 and the base plate 102 during operation of the disc drive 100, thus achieving a high degree of vibrational absorption and damping.

In a preferred embodiment of the invention, the damper pad 210 is positioned within the damper pad pocket 220 on the upper surface 218 of the base plate 102. Preferably, the damper pad pocket 220 comprises a recessed area in the upper surface 218 of the base plate 102, located centrally under the lower magnet plate 242. For example, as shown in FIGS. 2 and 6, the damper pad pocket 220 is preferably located at equal distance from each of the bosses 222. The damper pad pocket 220 acts as a guide for proper placement of the damper pad 210 during assembly of the disc drive 100. Additionally, the recessed nature of the damper pad pocket 220, relative to the upper surface 218 of the base plate 102, limits or prevents the movement of the damper pad 210 along the upper surface 218 of the base plate 102.

As shown in FIG. 6, the damper pad 210 is preferably of a sufficient thickness 610 to fit snugly between the lower magnet plate 242 and the base plate 102 in a manner which allows the damper pad 210 to touch both the bottom surface 612 of the lower magnet plate 242 and the upper surface 218 of the base plate 102, without causing the damper pad 210 to experience compressive forces which would render the pad 210 ineffective to dampen vibrations. It is important to keep in mind the manufacturing tolerances of the disc drive 100 when selecting a proper thickness for the damping pad 210. For example, as shown in FIG. 6, if the disc drive 100 is designed with a gap 624 distance of approximately $35/1000$ths of an inch between the point of attachment of the damper pad 210 to the base plate 102 and the lower magnet plate 242, and if the manufacturing tolerances of the disc drive 100 are such that the gap distance may vary $\pm 10/1000$ths of an inch, a damper pad thickness 610 of approximately $45/1000$ths of an inch would preferably be selected, so that the damper pad would be assured, in the worst case, of touching both the lower magnet plate 242 and the base plate 102.

Another factor that must be considered when selecting the damper pad 210 material is the overall stiffness of the material. Preferably the damper pad 210 is composed of a material having high damping properties. That is, the damper pad 210 is preferably composed of a material which easily converts strain applied to the material into heat. Additionally, the damper pad 210 is preferably composed of material having sufficient flexibility, such that when the damper pad 210 is placed between the lower magnet plate 242 and the base plate 102, the damper pad 210 will not cause the lower magnet 242 plate to bow. For instance, in the above example, the gap distance was chosen to be $35/1000$ths of an inch ($\pm 10/1000$ths of an inch) and the damper pad thickness 610 was chosen to be approximately $45/1000$ths of an inch. In this example, the material, of which the damping pad 210 is composed, must be sufficiently flexible such that in the case where the gap distance is at a minimum of $25/1000$ths of an inch, the magnet pad 210 will not cause the lower magnet 242 plate to bow. Additionally, in this example, the material, of which the damping pad 210 is composed, must still have sufficiently flexibility to absorb vibrations.

In one embodiment of the present invention, the damper pad is adhesively attached to the upper surface 218 of the base plate 102 within the damper pad pocket 220. For example, the damper pad may be adhesively attached to the base plate 102 via a pressure sensitive adhesive. Alternatively, if the damping pad 210 is composed of a polymeric viscoelastic damping material, the damper pad 210 may comprise a polymeric viscoelastic film having at least one adhesive surface. In such a case, the adhesive surface of the film, and thus the damper pad 210, would be adhered to the base plate 102 within the damper pad pocket 220. In this embodiment of the invention, one side of the damper pad 210 is secured to the top surface 218 of the base plate 102 at a point in the manufacturing process of the disc drive 100 before the lower magnet plate is attached to the base plate 102.

In another embodiment of the invention, the damper pad 210 is composed of polymeric viscoelastic damping material, such as is typically used in high damped acrylic pressure sensitive adhesives (PSA). For this embodiment, the material used needs to be thicker than a conventional (PSA) in order to optimize the strain and volume of the damping material.

With respect to the stiffness or hardness of the damping material as defined above, the hardness testing of plastic materials is commonly measured by the Shore (Durometer) test. The Shore test measures the resistance of a material to indentation. A material's Shore hardness is an empirical hardness value that, in general, does not correlate to other properties or fundamental characteristics of the material being tested. Shore hardness may be expressed as either the Shore A or Shore D scale, with the Shore A scale being commonly used for "softer" materials and the Shore D scale being used for "harder" materials. While the results obtained from this test are a useful measure of the hardness of various materials, the Shore hardness test does not serve well as a predictor of other material properties, such as strength or resistance to scratches, abrasion, or wear. As such, while a preferred range of Shore hardness is expressed for the damping pad 210 of the present invention, it will be clear to those skilled in the art that a number of factors may contribute to the selection of the material for the damper pad 210, depending on the objectives being sought. Among these objectives might be dynamic performance of the disc drive 100 over certain frequencies, ease of placement of the damper pad 210 in the disc drive 100, handling and cleanliness issues, as well as environmental factors, etc.

In one embodiment of the present invention, the damper pad is adhesively attached to the upper surface 218 of the base plate 102 within the damper pad pocket 220. For example, the damper pad may be adhesively attached to the base plate 102 via a pressure sensitive adhesive. Alternatively, if the damping pad 210 is composed of a polymeric viscoelastic damping material, the damper pad 210 may comprise a polymeric viscoelastic film having at least one adhesive surface. In such a case, the adhesive surface of the film, and thus the damper pad 210, would be adhered to the base plate 102 within the damper pad pocket 220. In this embodiment of the invention, one side of the damper pad 210 is secured to the top surface 218 of the base plate 102 at a point in the manufacturing process of the disc drive 100 before the lower magnet plate is attached to the base plate 102.

As shown in FIGS. 2 and 6, the shape or outer diameter of the damper pad 210 is preferably square or rectangular. As such, a number of damper pads 210 may be quickly and efficiently cut from a sheet of damping material, thus reducing costs in the disc drive manufacturing processes. However, it is to be understood that the damper pad 210 may encompass any number of shapes. Preferably the shape or outer diameter of the damper pad 210 will, however, be such that the damper pad 210 will fit within the damper pad pocket 220.

In summary, in view of the foregoing discussion it will be understood that a first embodiment of the present invention provides a disc drive (such as 100) including a base plate (such as 102) having an upper surface (such as 218), a voice coil motor (such as 124) operably attached to the upper surface of the base plate, and a damper pad (such as 210) positioned on the upper surface of the base plate between the base plate and the voice coil motor for damping vibrations occurring in the base plate and the voice coil motor. In this embodiment of the present invention, the disc drive preferably also includes a lower magnetic plate (such as 242) having an upper surface (such as 650) and an upper magnetic plate (such as 140) connected to the lower magnetic plate in a manner such that the upper magnetic plate is maintained in a spaced relationship to the upper surface of the lower magnetic plate. This embodiment of the present invention preferably also includes a single magnet (such as 128) pair positioned on the upper surface of the lower magnet plate. The damper pad in this embodiment is preferably positioned between the lower magnetic plate and the base plate. Additionally, the base plate in this embodiment of the invention preferably defines a recessed damper pad pocket (such as 220) along the upper surface of the base plate, with the damper pad preferably being positioned within the damper pad pocket. Furthermore, in this embodiment, The base plate preferably includes a number of bosses (such as 222) positioned between the base plate and the lower magnet plate.

Another embodiment of the present invention encompasses a disc drive including a base plate (such as 102) having an upper surface (such as 218), a voice coil motor (such as 124) attached to the upper surface of the base plate. In this embodiment the voice coil motor preferably has a lower magnetic plate (such as 242) spaced from the upper surface of the base plate and a damper pad (such as 210) positioned on the upper surface of the base plate between the base plate and the lower magnetic plate for damping vibrations occurring in the base plate and the lower magnet plate. The lower magnet plate preferably includes an upper surface (such as 218) and the voice coil motor preferably includes a single magnet pair (such as 128) positioned on the upper surface of the lower magnet plate. The base plate preferably includes a recessed damper pad pocket (such as 220) in the upper surface of the base plate and the damper pad is preferably positioned within the damper pad pocket. Additionally, the base plate preferably also includes a plurality of bosses (such as 222) integral with, and extend outwardly from, the upper surface of the base plate.

Yet another embodiment of the present invention relates to a disc drive damping system comprising a disc drive (such as 100) having a base plate (such as 102) and a voice coil motor (such as 126) connected to the base plate and a damping means (such as 210) positioned between the voice coil motor and the base plate for damping vibrations in the disc drive.

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, while the various embodiments above discuss the benefits of the present invention with respect to disc drives employing a single lower magnet pair, the present invention may also be used with respect to disc drives having other magnet pair arrangements. For instance, the present invention may be employed in disc drives employing a single magnet pair located on the upper magnet plate or in disc drives having magnet pairs located on both the upper and lower magnet plates. Additionally, while the above noted embodiments of the present invention discuss placing the damper pad 210 within the damper pad pocket 220, the damper pad pocket 220 may be eliminated and the damper pad 210 may be placed flush with the upper surface 218 of the base plate 102. Further, while the damper pad 210 is described as being placed centrally beneath the lower magnet plate 242, the damper pad 210 may be placed anywhere beneath the lower magnet plate 242 where it is determined that optimal damping may be achieved. Numerous other changes may be made which will readily suggest themselves to those skilled in the art and which are encompassed in the spirit of the invention disclosed and as defined in the appended claims.

What is claimed is:

1. A disc drive comprising:
   a base plate having an upper surface;
   a voice coil motor separate from the base plate operably attached to the upper surface of the base plate; and
   a damper pad positioned on the upper surface of the base plate between the base plate and the voice coil motor for damping vibrations occurring in the base plate and the voice coil motor.

2. The disc drive of claim 1, wherein the damper pad is adhesively attached to the upper surface of the base plate.

3. The disc drive of claim 1, wherein the damper pad comprises a fluoroelastomer damping material.

4. The disc drive of claim 1, wherein the damper pad comprises a viscoelastic damping material.

5. The disc drive of claim 1, wherein the damper pad comprises an elastomer having an A scale durometer hardness of between 30 and 90.

6. The disc drive of claim 1, wherein the base plate defines a recessed damper pad pocket along the upper surface thereof, and wherein the damper pad is positioned within the damper pad pocket.

7. The disc drive of claim 1, wherein the voice coil motor includes:
   a lower magnetic plate having an upper surface;
   an upper magnetic plate operably connected to the lower magnetic plate in a manner such that the upper magnetic plate is maintained in a spaced relationship to the upper surface of the lower magnetic plate; and
   a single magnet pair positioned on the upper surface of the lower magnet plate;
   wherein the damper pad is positioned between the lower magnetic plate and the base plate.

8. The disc drive of claim 2 wherein the base plate further includes a plurality of bosses positioned between the base plate and the lower magnet plate.

9. The disc drive of claim 8, wherein the plurality of bosses are integral with, and extend outwardly from, the upper surface of the base plate.

10. A disc drive comprising:
    a base plate having an upper surface;
    a voice coil motor separate from the base plate operably attached to the upper surface of the base plate, the voice coil motor having a lower magnetic plate spaced from the upper surface of the base plate;
    a damper pad positioned on the upper surface of the base plate between the base plate and the lower magnetic plate for damping vibrations occurring in the base plate and the lower magnet plate.

11. The disc drive of claim 10, wherein the lower magnet plate includes an upper surface and wherein the voice coil motor further includes a single magnet pair positioned on the upper surface of the lower magnet plate.

12. The disc drive of claim 11, wherein the base plate defines a recessed damper pad pocket along the upper surface of the base plate, and wherein the damper pad is positioned within the damper pad pocket.

13. The disc drive of claim 12, wherein the base plate further defines a plurality of bosses integral with, and extend outwardly from, the upper surface of the base plate.

14. The disc drive of claim 11, wherein the base plate defines a recessed damper pad pocket along the upper surface of the base plate and a plurality of bosses integral with, and extend outwardly from, the upper surface of the base plate, and wherein the damper pad is positioned within the damper pad pocket.

15. The disc drive of claim 14, wherein the damper pad comprises a fluoroelastomer damping material having an A scale durometer hardness of between 20 and 100.

16. The disc drive of claim 11, wherein the voice coil motor includes a single magnet pair operably connected thereto, wherein the base plate defines a recessed damper pad pocket along the upper surface of the base plate and a plurality of bosses integral with, and extend outwardly from, the upper surface of the base plate, and wherein the damper pad is positioned within the damper pad pocket.

17. The disc drive of claim 16, wherein the damper pad comprises a polymeric viscoelastic film having an adhesive surface adhered to the base plate.

18. A disc drive damping system comprising:
- a disc drive having a base plate and a voice coil motor separate from the base plate connected to the base plate; and
- a damping means positioned between the voice coil motor and the base plate for damping vibrations in the disc drive.

19. The disc drive damping system of claim 18, wherein the damping means includes attaching means for attaching the damping means to the base plate.

20. The disc drive damping system of claim 18, further including a guide means for assisting in proper placement of the damper pad during assembly of the disc drive.

21. The disc drive damping system of claim 18, wherein the voice coil motor includes a single magnet pair.

* * * * *